(12) United States Patent
Kanai et al.

(10) Patent No.: US 12,441,005 B2
(45) Date of Patent: Oct. 14, 2025

(54) ROBOT HAND FOR GRIPPING AND OPERATING A PIPETTE

(71) Applicant: Hitachi High-Tech Corporation, Tokyo (JP)

(72) Inventors: Yoshiki Kanai, Tokyo (JP); Hiroki Takahashi, Tokyo (JP); Toshifumi Mitsuyama, Tokyo (JP); Toru Shibata, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 940 days.

(21) Appl. No.: 17/579,963

(22) Filed: Jan. 20, 2022

(65) Prior Publication Data

US 2022/0266455 A1 Aug. 25, 2022

(30) Foreign Application Priority Data

Feb. 24, 2021 (JP) ................. 2021-027201

(51) Int. Cl.
*B25J 15/00* (2006.01)
*B25J 13/00* (2006.01)
*F16B 1/00* (2006.01)
*G01N 35/00* (2006.01)

(52) U.S. Cl.
CPC ......... *B25J 15/0066* (2013.01); *B25J 13/006* (2013.01); *B25J 15/0038* (2013.01); *F16B 1/00* (2013.01); *G01N 35/0099* (2013.01); *F16B 2200/83* (2023.08)

(58) Field of Classification Search
CPC .. B25J 15/0066; B25J 15/0038; B25J 13/006; F16B 1/00

USPC .......................................................... 294/213
See application file for complete search history.

(56) References Cited

U.S. PATENT DOCUMENTS

| 8,342,314 | B2* | 1/2013 | Michel | ................. | B65G 47/847 |
| | | | | | 198/803.6 |
| 8,388,035 | B2* | 3/2013 | Kamon | ................. | B25J 15/0266 |
| | | | | | 294/213 |
| 10,265,862 | B1* | 4/2019 | Alqasemi | ............. | B25J 15/0038 |
| 10,589,428 | B1* | 3/2020 | Linnell | .................... | B25J 13/06 |
| 2009/0067973 | A1 | 3/2009 | Eliuk et al. | | |
| 2018/0133893 | A1 | 5/2018 | Motojima et al. | | |

(Continued)

FOREIGN PATENT DOCUMENTS

EP    2 875 912 B1    5/2020
EP    3 936 871 A1    1/2022

(Continued)

OTHER PUBLICATIONS

Japanese-language Office Action issued in Japanese Application No. 2021-027201 dated Jan. 30, 2024 with English translation (6 pages).

(Continued)

*Primary Examiner* — Paul T Chin
(74) *Attorney, Agent, or Firm* — Crowell & Moring LLP

(57) ABSTRACT

A robot hand for gripping and operating a pipette, the robot hand including: an electric gripper; a pair of first finger members opened and closed by the electric gripper; a pair of second finger members provided on the first finger member and having a pipette gripping surface; and an operating mechanism installed on the first finger member to operate an operation target of the pipette.

12 Claims, 12 Drawing Sheets

(56) References Cited

U.S. PATENT DOCUMENTS

| | | |
|---|---|---|
| 2019/0126491 A1 | 5/2019 | Harkleroad et al. |
| 2019/0193282 A1 | 6/2019 | Iwasaki et al. |
| 2022/0168905 A1* | 6/2022 | Gontier ................ B25J 15/0042 |
| 2024/0238969 A1* | 7/2024 | Kanai ..................... B25J 9/163 |

FOREIGN PATENT DOCUMENTS

| | | |
|---|---|---|
| JP | 4-323562 A | 11/1992 |
| JP | 2016-209949 A | 12/2016 |
| JP | 2019-517958 A | 6/2019 |
| JP | 2019-117072 A | 7/2019 |
| KR | 10-2021-0099757 A | 8/2021 |
| WO | WO 2016/002019 A1 | 1/2016 |
| WO | WO 2021/095743 A1 | 5/2021 |

OTHER PUBLICATIONS

German-language Office Action issued in German Application No. 10 2022 200 781.6 dated Oct. 4, 2022 with English translation (13 pages).

\* cited by examiner

ROBOT HAND FOR GRIPPING AND OPERATING A PIPETTE

CLAIM OF PRIORITY

The present application claims priority from Japanese Patent application serial no. 2021-27201, filed on Feb. 24, 2021, the content of which is hereby incorporated by reference into this application.

BACKGROUND OF THE INVENTION

1. Field of the Invention

The present disclosure relates to a robot hand, and particularly to a robot hand suitable for automating a dispensing operation.

2. Description of the Related Art

For automation of work in laboratories and research rooms such as measurement and analysis work, development and research of a robot hand provided at a distal end of a robot arm have been conducted in order to cause a robot to grip and operate a work tool such as a pipette.

For example, JP 2019-117072 A discloses an end effector including a holding portion that holds a pipette (multichannel pipette), a motor, and a swing portion that is driven by the motor and swings to press and operate a pressing button of the pipette.

In addition, for example, JP 2016-209949 A discloses a specimen processing system including a plurality of arm tip tools detachably attached to the distal end of a robot arm, in which a pipette operation hand including a holder for fixing a pipette and a pressing member is prepared as one of the plurality of arm tip tools, and the pipette can be operated only by the pipette operation hand.

SUMMARY OF THE INVENTION

The end effector (robot hand) disclosed in JP 2019-117072 A assumes only correspondence of a specific pipette (multichannel pipette), and when handling other types (types having different configurations) of pipettes, there is a possibility that another end effector needs to be prepared, and versatility is low. Since it is conceivable to handle a plurality of types of pipettes having different configurations depending on the work content, when the number of end effectors to be prepared correspondingly increases, there are many opportunities to replace the end effector during the work of the robot, and there is a problem that the work time of the robot increases.

In addition, in the specimen treatment system disclosed in JP 2016-209949 A, when handling a plurality of types of pipettes having different configurations, it is necessary to prepare an arm tip tool (pipette operation hand) for each pipette having a different configuration as in JP 2019-117072 A. In addition, since it is necessary to mount a mechanism for attaching and detaching the arm tip tool to and from the distal end of the robot arm and a mechanism for operating a pipette on the arm tip tool, there is a possibility that the arm tip tool becomes large in size. In this case, it may be difficult for the operator to handle the pipette, particularly in an environment in which the operator and the robot work together. Therefore, it is desirable that the pipette is in a state where the operator can easily handle the pipette.

An object of the present disclosure is to provide a highly versatile robot hand capable of easily handling a plurality of types of pipettes having different configurations.

In order to achieve the above object, a robot hand of the present disclosure is configured as described in the claims. Note that, in the claims, the recitation of other claims in the recitation form is a single recitation in order to facilitate understanding of the recitation of the claims in the recitation form. However, the present disclosure includes a form of reciting a plurality of claims (multiple recitation) and a form of reciting a plurality of multiple recitation claims in the recitation form.

A specific example of a robot hand in the present disclosure is a robot hand for gripping and operating a pipette. The robot hand includes: an electric gripper; a pair of first finger members opened and closed by the electric gripper; a pair of second finger members provided on the first finger member and having a pipette gripping surface; and an operating mechanism installed on the first finger member to operate an operation target of the pipette.

According to the present invention, it is possible to obtain a highly versatile robot hand capable of easily handling a plurality of types of pipettes having different configurations.

Objects, configurations, and effects besides the above description will be apparent through the explanation on the following embodiments.

DESCRIPTION OF THE PREFERRED EMBODIMENTS

Figure 1:
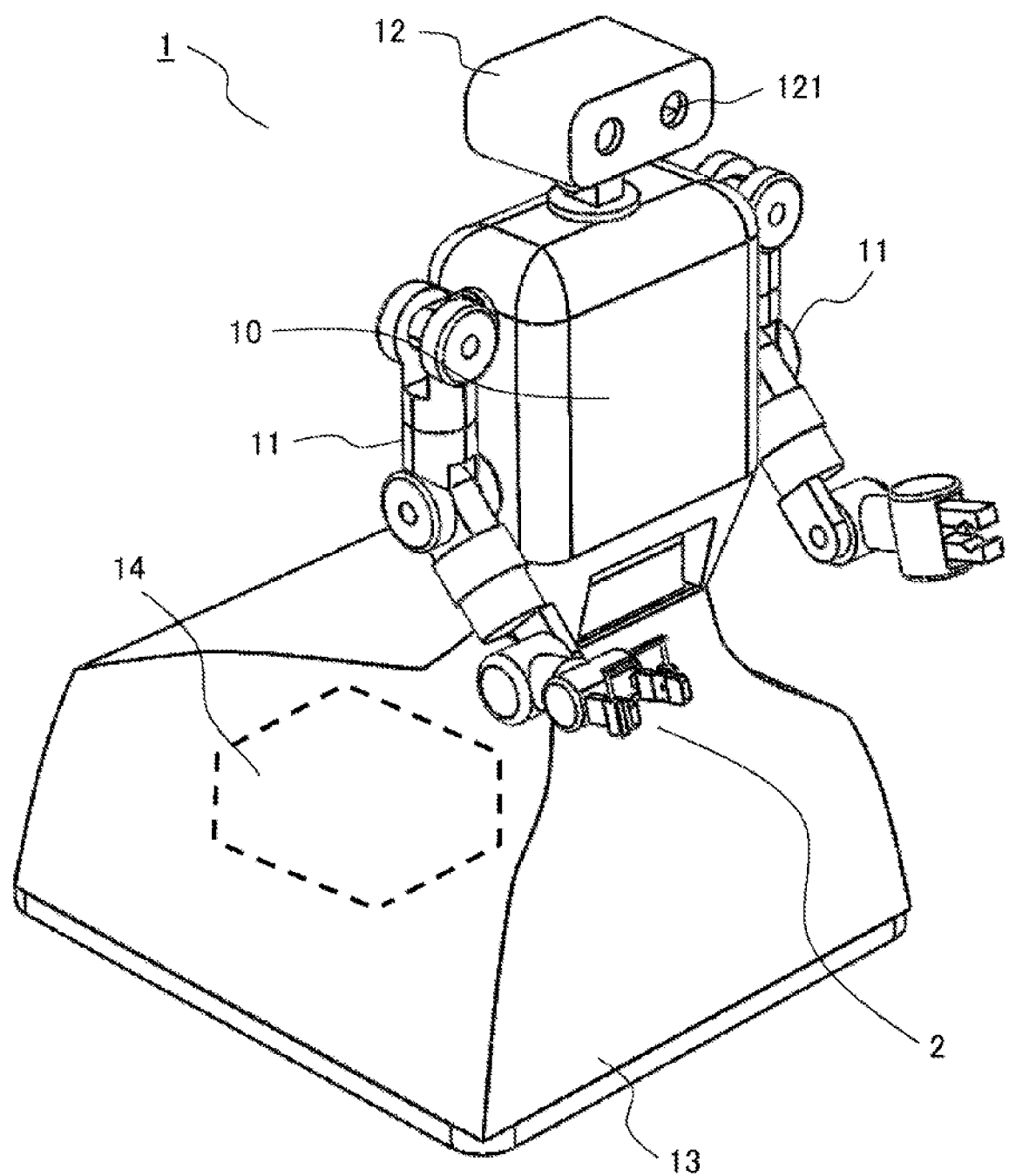
FIG. 1 is a view illustrating an appearance of a robot according to a first embodiment.

Hereinafter, some embodiments of the invention will be described with reference to the drawings. Further, the drawings illustrate embodiments and examples according to the principle of the disclosure in order to help with understanding of the invention, but the disclosure is not interpreted in a limited way. The description of this specification is given only as a typical example, and does not limit the scope of claims or applications of the invention.

In this embodiment described below, the explanation has been made in detail sufficiently for a person skilled in the art to implement the disclosure while other mounting/embodiments may be possible. It is necessary to understand that changes in configuration/structures and replacements of various elements may be implemented without departing from the scope of the technical ideas of the disclosure. Therefore, the following description must not be interpreted in a limited way.

First, before describing the embodiments of the present invention in detail, an outline of the embodiments of the present invention will be described.

Focusing on requirements necessary for a robot hand for pipette gripping and operation, there are two points: (1) an inner surface of a pipette gripper in contact with a pipette has a shape fitted to an outer shape of the pipette; and (2) a mechanism (hereinafter, an operating mechanism will be described) for pressing and operating a pressing button or the like (hereinafter, it is referred to as an operation target) provided on the pipette for suction or discharge of a liquid in the pipette, removal of a tip attached to the distal end of the pipette, or the like is at a position where an operation target can be operated only by a simple uniaxial operation.

In the embodiment of the present invention, a plurality of types of pipettes having different configurations can be easily handled by including members that respectively satisfy the above two requirements and enabling replacement in units of members.

That is, a robot hand according to an embodiment of the present invention is a robot hand for gripping and operating a pipette, and includes an electric gripper, a first finger member opened and closed by the electric gripper, a second finger member installed on a gripping surface of the first finger member, and an operating mechanism installed on the first finger member and for operating an operation target of the pipette. In other words, in the robot hand according to the embodiment of the present invention, (a) the second finger member having a shape corresponding to the outer diameter of the pipette and (b) the operating mechanism for operating the operation target of the pipette are separately attached to the first finger member attached to or integrated with the electric gripper of the robot hand so as to be replaceable. A plurality of second finger members and a plurality of operating mechanisms are prepared corresponding to pipettes to be handled.

Among the above two requirements, (1) the fact that the inner surface of the pipette gripper in contact with the pipette has a shape fitted to the outer shape of the pipette is satisfied by holding the pipette via the second finger member, and (2) the fact that the operating mechanism is at a position where the operation target can be operated only by a simple uniaxial operation is satisfied by the operating mechanism being installed on the first finger member, and both of them are arranged on the first finger member attached to the electric gripper, so that easy replacement can be performed. That is, the second finger member is replaced to correspond to various types of pipettes, and a plurality of operation units of the operating mechanism is installed or movable to correspond to positions of operation targets of various types of pipettes.

As described above, the robot hand according to the embodiment of the present invention is not configured to replace the entire robot hand according to the pipette, but can handle a plurality of types of pipettes by replacing only the second finger member attached to the peripheral side from the first finger member and the operating mechanism. As a result, a robot hand having high exchangeability and high versatility can be obtained because the number of parts to be replaced is smaller than that of a conventional robot hand when holding and operating various kinds of pipettes.

Next, embodiments of the present invention will be described in detail.

First Embodiment

A configuration of a robot hand 2 according to a first embodiment of the present invention will be described with reference to FIGS. 1 to 9.

FIG. 1 illustrates a configuration example of a robot 1 to which the robot hand 2 is attached. The robot 1 includes a robot body 10, an articulated robot arm 11 equipped with an actuator and a position sensor at each joint, a robot head 12 incorporating a camera 121, and a moving mechanism 13. The robot hand 2 is attached to a distal end of the robot arm 11. Further, the robot 1 includes a control unit 14 that controls the operation of the above-described components.

The robot 1 moves in the work environment by the moving mechanism 13, and moves in front of the work table on which the pipette and the like are placed. Thereafter, the robot 1 recognizes the pipette position on the work table by the camera 121, and moves the robot arm 11 to the recognized position to bring the robot hand 2 close to the pipette position. Thereafter, the robot 1 grips and operates the pipette by the robot hand 2 to perform a dispensing operation. The above operation is planned and controlled by the control unit 14, and can be automatically executed.

Note that the configuration of the robot 1 is not limited to the above configuration, and various known robots can be used.

Figure 2:
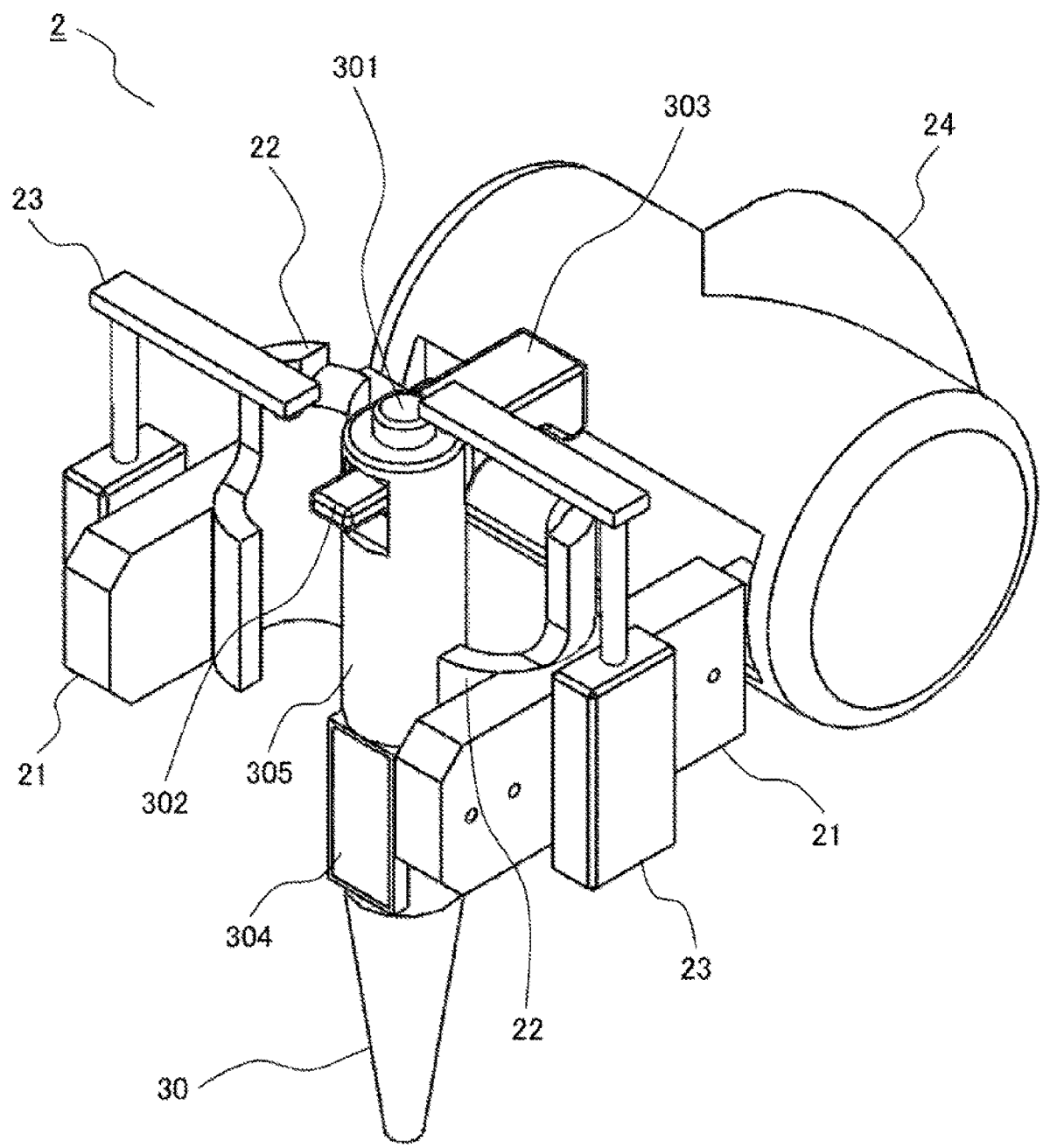
FIG. 2 is a view illustrating when a pipette of a robot hand is released according to the first embodiment.

FIG. 2 illustrates a configuration of the robot hand 2. The robot hand 2 includes a first finger member 21, a second finger member 22, an operating mechanism 23, and an electric gripper 24, and grips and operates a pipette 30. Although details will be described later, since the second finger member 22 and the operating mechanism 23 are attached to and detached from the electric gripper 24 via the first finger member 21, all of the first finger member 21, the second finger member 22, and the operating mechanism 23 can be regarded as a robot hand attachment.

The first finger member 21 is configured in pair (One each is arranged on the left and right in the drawing). The pair of first finger members 21 is attached to an operation end of the electric gripper 24 that performs a stroke operation, is opened and closed by the electric gripper 24, and is movable in a direction facing each other. As the electric gripper 24, a known electric gripper can be used. In the present embodiment, the first finger member 21 is attached to the electric gripper 24 by a screw structure, a fitting structure, or the like so as to be detachable and replaceable, but the first finger member 21 may be configured as an operation end of the electric gripper 24. That is, the first finger member 21 may be configured as a part of the electric gripper 24. However, if the first finger member 21 is configured separately from the electric gripper 24, and the first finger member 21 is attached to and detached from the electric gripper 24, the general-purpose electric gripper 24 can be used.

The second finger member 22 is attached and disposed on each surface of the first finger member 21 on which the pair of first finger members 21 faces each other, that is, inside the first finger member 21. In the present embodiment, the electric gripper 24 is driven so that the pipette 30 is gripped by the pair of second finger members 22 via the pair of first finger members 21. This configuration can also be said to be obtained by dividing the grip portion driven by the electric gripper 24 into the first finger member 21 and the second finger member 22. How to attach the second finger member 22 to the first finger member 21 will be described later.

The operating mechanism 23 operates operation targets 301 and 302 of the pipette 30, is provided at least one in the robot hand 2, and is attached to the first finger member 21. In the present embodiment, two operating mechanisms 23 are installed. Although details will be described later, the operating mechanism 23 is installed on the first finger member 21 so as to be at a position where the pipette 30 can be operated.

Since the operating mechanism 23 is installed on the first finger member 21, the operating mechanism 23 can be brought close to the gripping position of the pipette 30 by controlling the gripping operation of the first finger member 21. Therefore, it is not necessary to separately provide a moving mechanism in the operating mechanism 23 itself, and the operating mechanism 23 can be downsized. Further, when the robot hand 2 is brought close to the pipette 30 to grip the pipette 30, if the space between the pair of first finger members 21 is kept open, the operating mechanism 23 does not hinder the gripping of the pipette 30.

The pipette 30 handled in the present embodiment is an electric pipette, and includes a first operation target 301, a second operation target 302, a finger hook 303, a display screen 304, and a grip target 305. In the present embodiment, the first operation target 301 is a button for discharging or sucking, and the second operation target 302 is a lever for removing a tip attached to the distal end of the pipette 30. The finger hook 303 is for preventing the pipette 30 from being displaced at the time of pipetting, and is supported by a support surface 223 of the second finger member 22 described later. The display screen 304 is a liquid crystal display that displays settings, states, and the like of the pipette. The grip target 305 is a portion gripped by the second finger member 22. As the pipette 30, for example, a commercially available pipette is used, and various types of pipettes having different shapes and positions of a grip target and an operation target are used. Note that the pipette 30 is not limited to an electric pipette, and may be a pipette manually operated pipette.

In the present embodiment, the second finger member 22 is configured to be in direct contact with the pipette 30 (grip target 305), and the inner surface of the second finger member 22 has a shape that fits or corresponds to the outer shape of the pipette 30 (grip target 305). Further, in the present embodiment, the operating mechanism 23 is at a position where an operation target (first operation target 301 and second operation target 302) of the pipette 30 can be operated only by a simple uniaxial motion (to be described in detail later). The second finger member 22 and the operating mechanism 23 are configured to be attached to the first finger member 21. As a result, it is possible to grip and operate various other types of pipettes 30 by replacing the second finger member 22 and adjusting the position of the operating mechanism 23 as necessary. Further, tool replacement in which the second finger member 22 and the operating mechanism 23 are also replaced by replacing the first finger member 21 can also be selected. As a result, tool replacement for handling a plurality of types of pipettes having different configurations as compared with the conventional robot hand is facilitated, and the electric gripper 24 can have a common configuration regardless of the shape of the pipette, and versatility is also enhanced. Next, these points will be described in detail.

Figure 3:
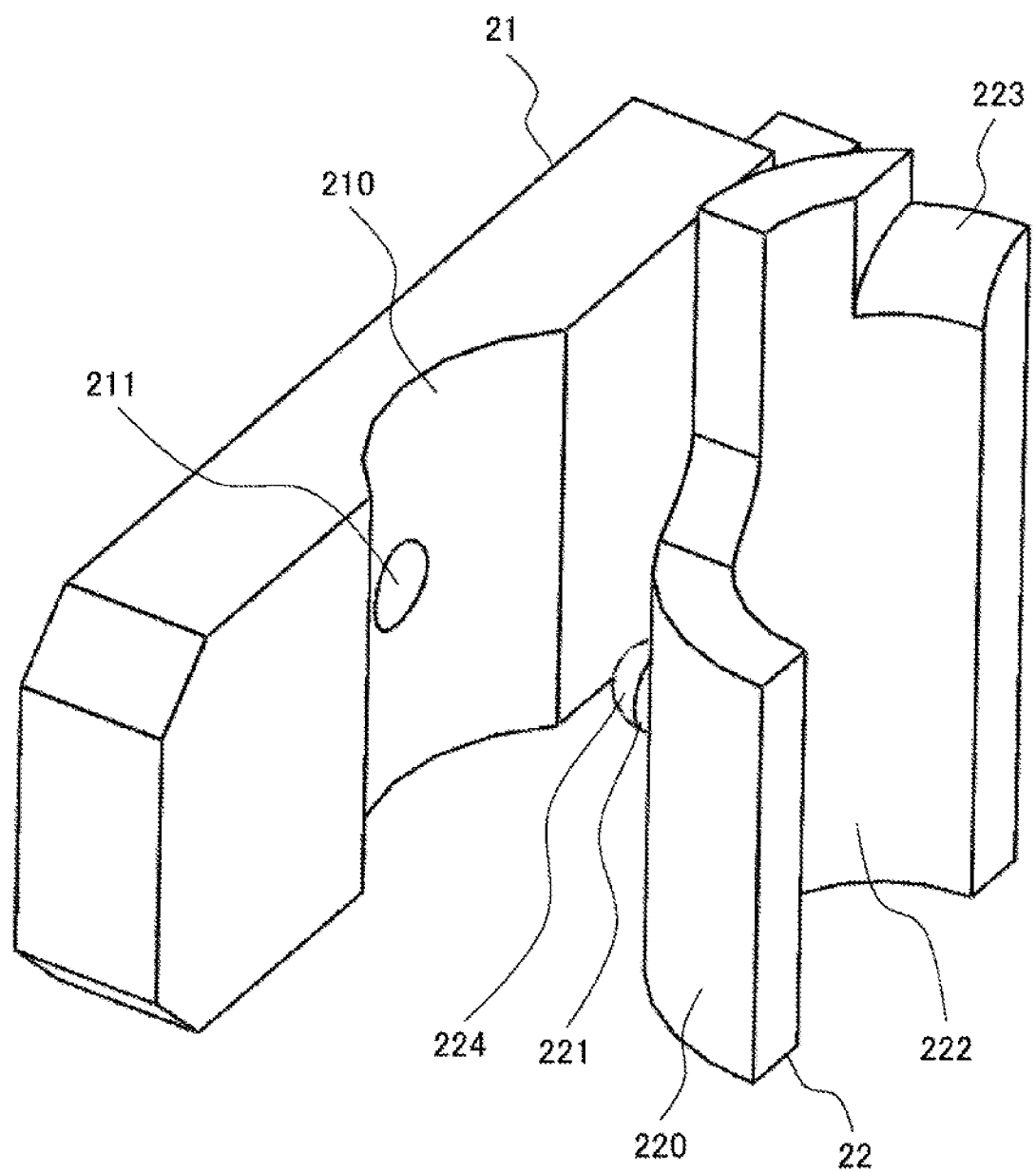
FIG. 3 is a view illustrating a configuration relationship between a first finger member and a second finger member in the first embodiment.

FIG. 3 illustrates structural examples of the first finger member 21 and the second finger member 22. Since the pair of first finger members 21 and the pair of second finger members 22 have substantially the same configuration (substantially symmetrical configuration) as illustrated in FIG. 2, only one side (left side in FIG. 2) is illustrated in FIG. 3.

The second finger member 22 has a semi-cylindrical convex portion 220 in which an outer side of a cross section in a direction perpendicular to the longitudinal direction of the pipette is formed in an arc shape on an outer surface in contact with the first finger member 21. The first finger member 21 has, on an inner surface (gripping surface) in contact with second finger member 22, a semi-cylindrical concave portion 210 in which an inner side of a cross section in a direction perpendicular to the longitudinal direction of the pipette is formed in an arc shape and which can be fitted to the semi-cylindrical convex portion 220 of the second finger member 22. The fitting between the semi-cylindrical convex portion 220 and the semi-cylindrical concave portion 210 is referred to as a first fitting structure.

The semi-cylindrical convex portion 220 of the second finger member 22 has a fitting convex portion 221, and the semi-cylindrical concave portion 210 of the first finger member 21 has a fitting concave portion 211 that can be fitted to the fitting convex portion 221. The fitting between the fitting convex portion 221 and the fitting concave portion 211 is referred to as a second fitting structure.

With the first fitting structure and the second fitting structure described above, the position and posture of the second finger member 22 with respect to the first finger member 21 can be fixed.

When the robot hand 2 handles the pipette 30, the second finger member 22 may be attached to the first finger member 21 in advance and then the pipette 30 may be grasped, or the second finger member 22 attached to the pipette 30 in advance may be attached to the first finger member 21.

When the second finger member 22 is attached to the first finger member 21 in advance, an inner surface of the second finger member 22 has a shape fitted to or corresponding to the outer shape of the pipette 30 (grip target 305), so that an additional attaching member is not required for the pipette 30. Therefore, the operator who performs the work in cooperation with the robot 1 can easily handle the pipette 30.

On the other hand, when the second finger member 22 is attached to the pipette 30 in advance, a plurality of pipettes can be handled without replacing the second finger member 22.

When second finger member 22 is attached to pipette 30 in advance, the semi-cylindrical concave portion 210 that is a gripping surface of the first finger member 21 has a semi-cylindrical shape, whereby the pipette 30 to which second finger member 22 is attached can be gripped at an appropriate gripping position. That is, for example, when the robot arm 11 is driven to automatically grip the pipette 30 to which the second finger member 22 is attached, even if the arm tip position is displaced, the fitting convex portion 221 is guided to the fitting concave portion 211 by the contact between a spherical surface 224 of the protrusion tip and the semi-cylindrical concave portion 210, and the second finger member 22 can be moved to an appropriate fitting position, and the pipette 30 can be gripped at an appropriate gripping position.

When the second finger member 22 is attached to the pipette 30 in advance, the second finger members 22 (the abutting surfaces of the semi-cylindrical ends) are coupled to each other by a fitting shape or a magnetic force.

In addition, when the second finger member 22 is attached to the pipette 30 in advance, the outer surfaces of the pair of second finger members 22 have a cylindrical shape by the semi-cylindrical convex portions 220, and thus the shape is easy for the operator to grip, and the pipette 30 can be easily handled in an environment where the operator and the robot 1 perform work in cooperation. In addition, it is conceivable to attach the operating mechanism 23 to the second finger member 22 that grips the pipette 30. However, in a case where the second finger member 22 is attached to the pipette 30 in advance with such a configuration, the configuration becomes complicated and large, and the configuration becomes difficult for the operator to grip, and it becomes difficult for the operator and the robot to share the pipette. That is, by separately attaching and detaching the second finger member 22 and the operating mechanism 23 to and from the first finger member 21, the pipette can be shared by the operator and the robot with high versatility.

In FIG. 3, the first finger member 21 has the semi-cylindrical concave portion 210, and the second finger member 22 has the semi-cylindrical convex portion 220. However, the first finger member 21 may have a convex shape, and the second finger member 22 may have a concave shape. That is, a convex shape may be formed on one of the surfaces on which the first finger member 21 and the second finger member 22 are in contact, and a concave shape may be formed on the other surface. However, when the second finger member 22 has a concave shape, the pipette 30 to which second finger member 22 is attached has a shape that is difficult for the operator to grip. Therefore, it is desirable to grip the pipette 30 after the second finger member 22 is attached to the first finger member 21.

Similarly, one of the fitting portions (the fitting concave portion 211 and the fitting convex portion 221) may have a convex shape and the other may have a concave shape, and the first finger member 21 may have the fitting convex portion and the second finger member 22 may have the fitting concave portion.

Further, the second finger member 22 has, on the inner surface, a curved surface 222 that can be fitted to the outer shape of the grip target 305 of the pipette 30, and the support surface 223 that can be fitted to the finger hook 303 of the pipette 30 to support the pipette 30 in the longitudinal direction of the pipette 30. A concave portion is formed at a position of the support surface 223 by the pair of second finger members 22, and the finger hook 303 is placed and fitted in the concave portion. The support surface 223 of the second finger member 22 supports the finger hook 303 of the pipette 30 so as to oppose the force given by the operating mechanism 23 to the operation targets 301 and 302. As a result, the pipette 30 is not displaced during the pipetting operation, and the pipetting operation can be appropriately performed.

With the above configuration, the second finger member 22 can fix the positions and postures of the pipette 30 and the second finger member 22 when the pipette 30 is gripped. In addition to the fixing method described above, for example, the positions and postures of the pipette 30 and the second finger member 22 may be fixed by using an uneven portion such as the display screen 304 of the pipette 30. Alternatively, the positions and postures of the pipette 30 and the second finger member 22 may be fixed by using the characteristics of the outer shape as long as it is other than the operation target of the pipette 30.

When the fitting structure of the pipette 30 and the second finger member 22 and the fitting structure of the first finger member 21 and the second finger member 22 are combined, the positions and postures of the pipette 30 and the first finger member 21 can be uniquely determined, and the position and posture of the pipette 30 are not displaced even when a force is applied by the operating mechanism 23. As described above, it is easy to teach the dispensing operation to the robot 1.

Figure 4:
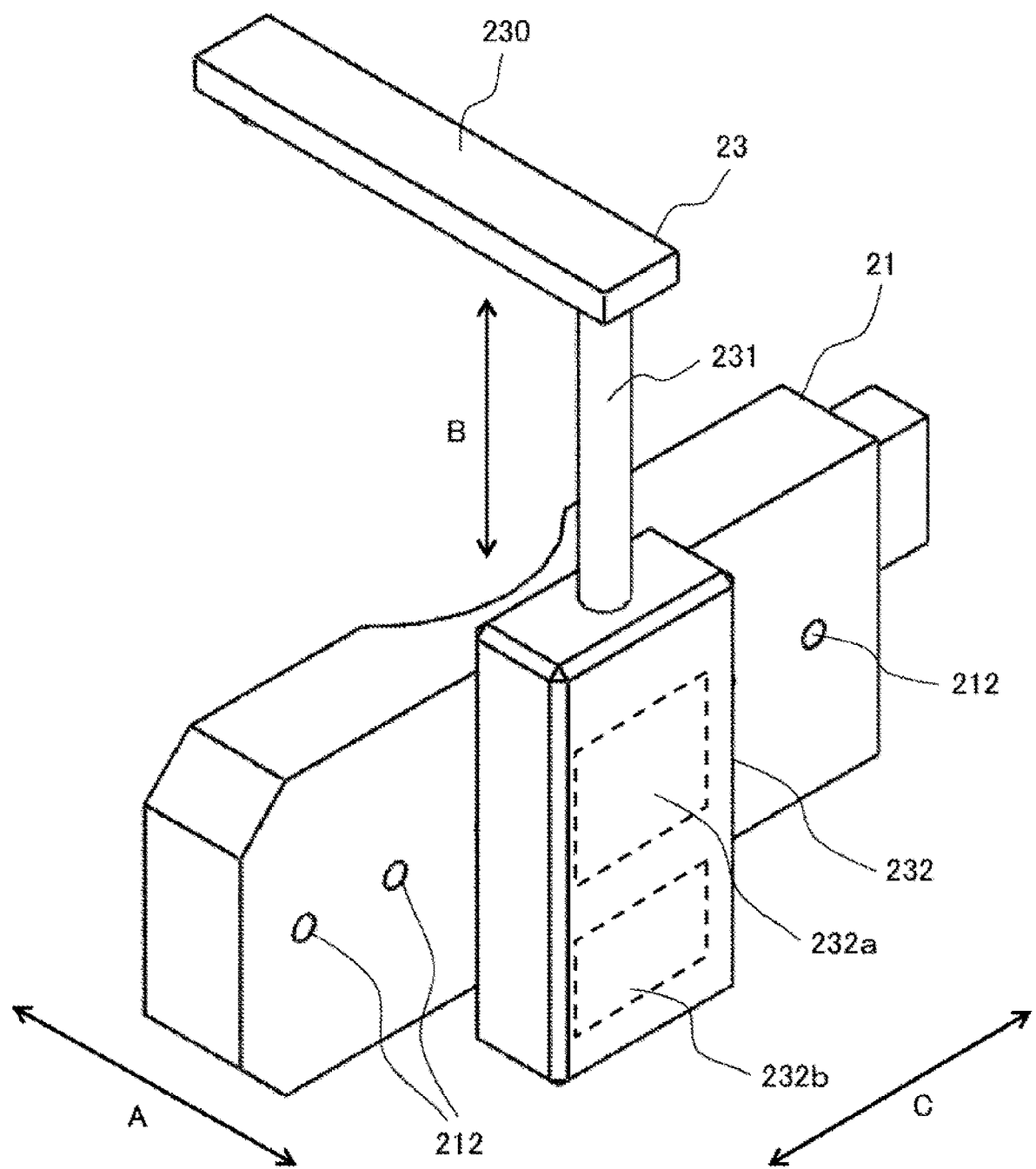
FIG. 4 is a view illustrating a configuration relationship between the first finger member and an operating mechanism in the first embodiment.

FIG. 4 illustrates structures of the first finger member 21 and the operating mechanism 23. Each pair of the first finger member 21 and the operating mechanism 23 has substantially the same configuration (substantially symmetrical configuration) as illustrated in FIG. 2, and thus only one side (right side in FIG. 2) is illustrated in FIG. 4. The operating mechanism 23 includes an operation member (lever) 230, a stroke portion 231, and an actuator unit 232. The operation member 230 protrudes inward of the first finger member 21 (toward the second finger member 22) with a gripping direction component in the opening/closing direction A of the electric gripper 24. When the actuator inside the actuator unit 232 is driven, the stroke portion 231 swings (movement up and down in drawings) in a direction B having a component perpendicular to the direction A, thereby operating the workpiece of the pipette 30. The direction B is also the same direction as the longitudinal direction of the pipette.

In addition, a battery 232a and a radio communication device 232b are mounted inside the actuator unit 232, and the actuator can be driven by performing radio communication with the control unit 14. With the above configuration, the wiring work can be omitted at the time of replacing the operating mechanism 23, the replacement time can be shortened, and the operation failure of the operating mechanism 23 due to the deterioration of the wiring does not occur.

The first finger member 21 has two or more operating mechanism position adjusting holes 212 for fixing the operating mechanism 23, and the operating mechanism position adjusting holes 212 enable attachment, detachment, and position adjustment (position adjustment in the direction C) of the operating mechanism 23 with respect to the first finger member 21.

In order to fix the operating mechanism 23 to the operating mechanism position adjusting hole 212 of the first finger member 21, a projection to be fitted to the operating mechanism position adjusting hole 212 may be formed on a fixing member (not illustrated) such as the operating mechanism 23 or a fixing plate for fixing the operating mechanism attached to the operating mechanism 23.

Further, the first finger member 21 may have a protruding shape instead of the operating mechanism position adjusting hole 212, and may be fixed by providing a hole on the operating mechanism 23 side and fitting each hole.

The operating mechanism position adjusting hole 212 of the first finger member 21 for fixing the operating mechanism 23 may be a screw hole. In this case, by providing an elongated hole in the operating mechanism 23 or a member (not illustrated) for fixing the operating mechanism 23 and screwing the elongated hole, stepless position adjustment can be performed.

In FIG. 4, the operating mechanism 23 is disposed outside the first finger member 21, but may be disposed on the upper surface, the lower surface, or the inside of the first finger member 21. However, since it is necessary to be at a position that does not hinder the gripping of the pipette 30, it is desirable to install the pipette on the outer side of the first finger member 21.

The above is the configuration of the robot hand 2 according to the first embodiment of the present invention. When another type of pipette different from the pipette 30 illustrated in FIG. 2, that is, a pipette having a grip target shape different from the grip target 305 and having a different shape, position, and number of operation targets from the operation targets 301 and 302 is gripped and operated, the second finger member 22 is replaced with a pipette conforming to each feature of the pipette, so that the operating mechanism 23 can be replaced with a pipette conforming to each feature of the pipette or the position can be adjusted.

Next, the operation of the robot hand 2 according to the first embodiment will be described.

Figure 5:
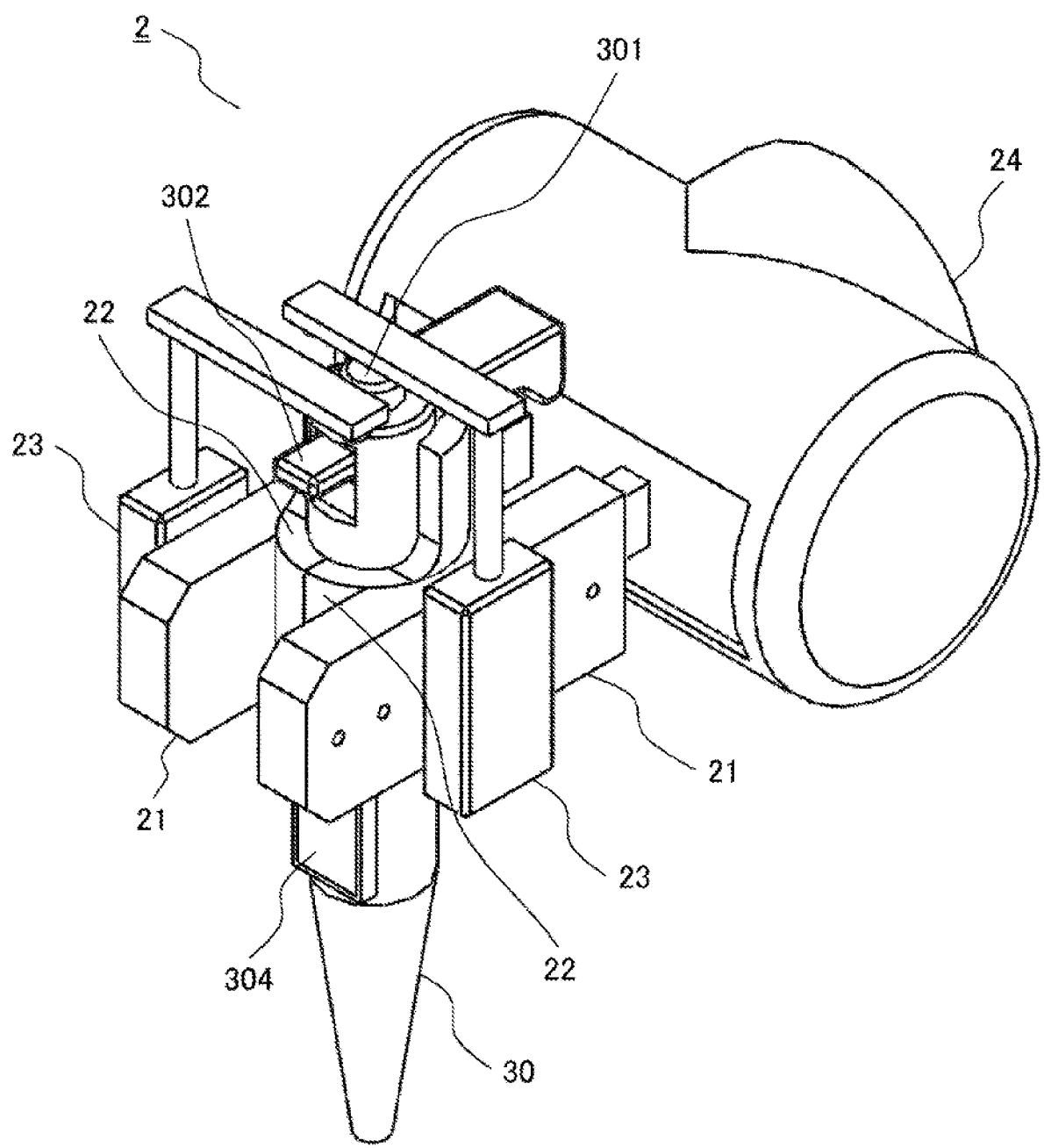
FIG. 5 is a view illustrating a state where the robot hand grips the pipette according to the first embodiment.

FIG. 5 illustrates a state where the robot hand 2 grips the pipette 30.

When the pair of first finger members 21 is closed by the electric gripper 24, the pipette 30 is gripped by the robot hand 2 via the second finger member 22.

In the first embodiment, the pipette 30 has two operation targets (the first operation target 301 and the second operation target 302). One operating mechanism 23 is attached to each of the pair of first finger members 21 in order to correspond to the two operation targets. The installation position and the number of operating mechanisms are adjusted according to the position and the number of operation targets of the pipette 30 to be gripped. For example, two operating mechanisms 23 may be placed on one of the first finger members 21. In FIG. 5, the operating mechanism 23 is installed so that the swing direction B of the operation member 230 overlaps the first operation target 301 and the second operation target 302 of the corresponding pipette 30 at the time of gripping. That is, the operating mechanism 23 on the right side is fixed to the first finger member by adjusting the position of the first operation target 301 of the pipette 30 and the operating mechanism 23 on the left side is fixed to the first finger member 21 by adjusting the position of the second operation target 302 of the pipette 30.

The display screen 304 of the pipette 30 is gripped so as to face the opposite side to the electric gripper 24. As a result, when working together with the operator, the operator can view the display screen 304, so that the state of the pipette 30 can be easily monitored.

Figure 6:
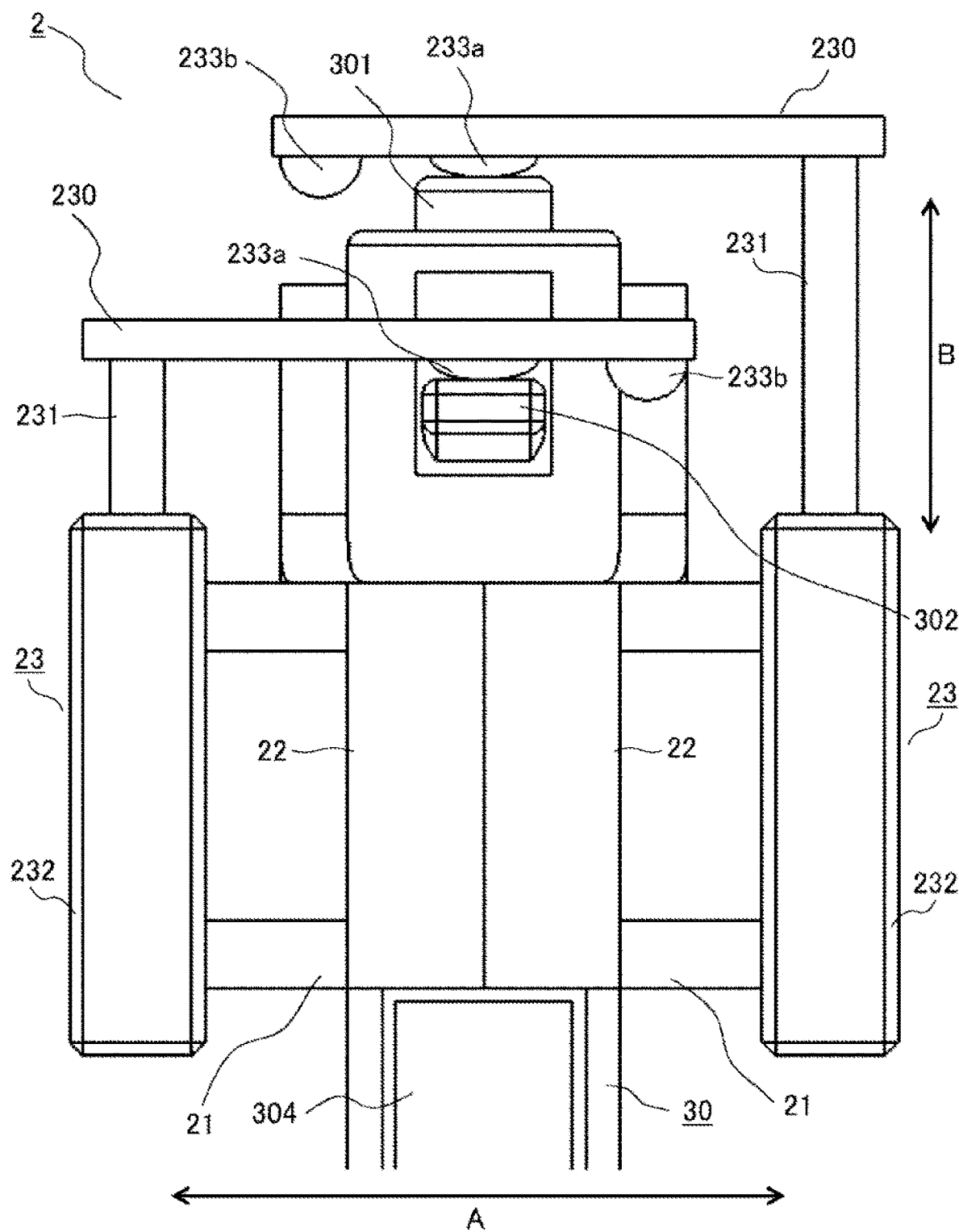
FIG. 6 is a view illustrating a positional relationship between the operating mechanism and a pipette grip target at the time of pipetting according to the first embodiment.

FIG. 6 illustrates a state where the robot hand 2 operates the pipette 30 as a front view. When the stroke portion 231 swings in the direction B, the operation protrusions 233a installed on the respective operation members 230 in the direction in contact with the first operation target 301 and the second operation target 302 of the pipette 30 come into contact with the first operation target 301 and the second operation target 302, respectively, and operate the pipette 30.

Figure 7:
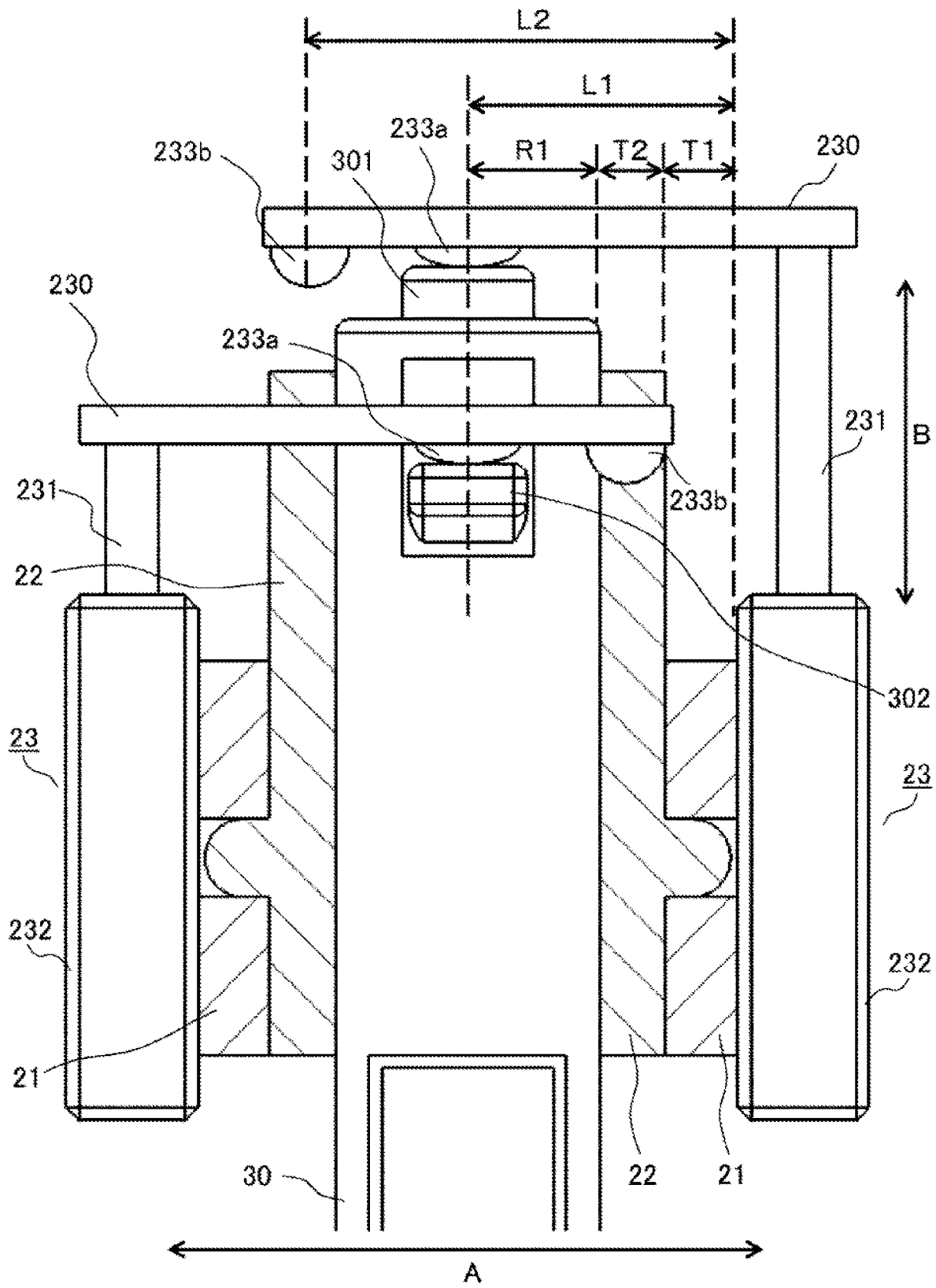
FIG. 7 is a view illustrating a sectional view of the first finger member and the second finger member at the time of pipetting according to the first embodiment.

FIG. 7 is a sectional view of the first finger member 21 and the second finger member 22 in a front view when the robot hand 2 operates the pipette 30.

In the first embodiment, in the opening/closing direction A of the gripper, the distance from the contact surface between the operating mechanism 23 and the first finger member 21 to the contact surface between the first finger member 21 and the second finger member 22 (thickness of the first finger member 21) is defined as T1, the distance from the contact surface between the first finger member 21 and the second finger member 22 to the contact surface between the second finger member 22 and the pipette 30 (thickness of the second finger member 22) is defined as T2, the distance from the contact surface between the second finger member 22 and the pipette 30 to the center of the operation target 301 is defined as R1, and the distance from the contact surface between the operating mechanism 23 and the first finger member 21 to the center of the operation protrusion 233a is defined as L1. Here, in order to operate the operation target 301 by the vertical movement of the operation member 230, the relationship between the distances is L1=T1+T2+R1. Here, in a case where pipettes having different outer diameters are gripped, when the value of R1 becomes R1' due to a change in the outer diameter of the pipette, T2 is newly set as T2', and T2'=L1−T1−R1' is set. However, T2'>0. As a result, pipettes having different outer diameters can be operated only by replacing the second finger member 22 without replacing the first finger member 21 and the operating mechanism 23.

In the first embodiment, the lengths of the two operation members 230, the number of operation protrusions, and the shapes are the same, but may be different. Further, by installing a plurality of operation protrusions having different heights in the opening/closing direction A of the electric gripper 24 of the operation member 230, it is possible to operate pipettes having different shapes of the operation targets.

The material of the operation protrusion 233 is not particularly selected as long as it can be reliably operated without damaging the target operation target. For example, in the case of a rubber material, it is possible to perform an operation in a state in which slippage between the protrusion and the operation target hardly occurs, and it is possible to prevent an operation failure and generation of extra thrust.

Further, the operation member 230 may not have the operation protrusion as in 233, and may have a shape capable of reliably operating the target operation target. For example, the surface of the operation member 230 in contact with the operation target 301 may have a concave shape.

In the first embodiment, the operation protrusion 233a and the operation protrusion 233b are provided. The distance from the contact surface between the operating mechanism 23 and the first finger member 21 to the center of the operation protrusion 233b is defined as L2. When a distance R1" from the contact surface between the second finger member 22 and the pipette 30 to the center of the operation target to be operated by the operation protrusion 233b is defined, a distance T2" from the contact surface between the first finger member 21 and the second finger member 22 to the contact surface between the second finger member 22 and the pipette 30 is defined as T2"=L2−T1−R1". As a result, it is possible to operate pipettes having different operation targets in different shapes only by replacing the second finger member 22 without replacing the first finger member 21 and the operating mechanism 23.

In a case where the second finger member 22 is attached to the pipette 30 in advance, the thickness of the second finger member 22 is set to a value T2' or the like at which the operation target 301 can be operated according to the outer diameter of the pipette as described above, so that the operating mechanism 23 does not need to be replaced even when handling pipettes having different outer diameters. As described above, if the configuration of the robot hand 2 other than the second finger member 22 is constant, the replacement time of the components can be eliminated.

Next, a configuration of the robot hand 2 when the pipettes 31 having different shapes are gripped and operated will be described.

Figure 8:
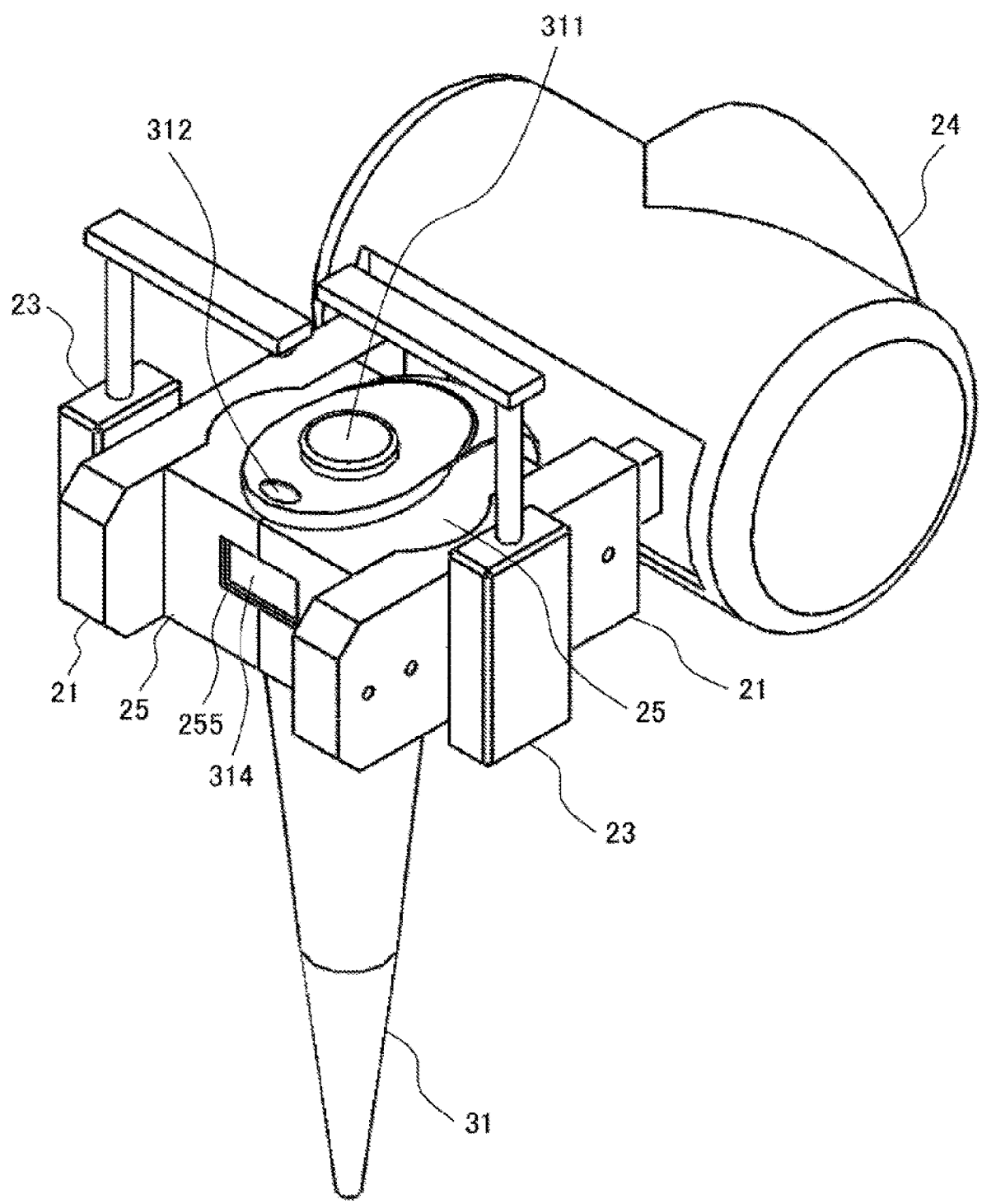
FIG. 8 is a view illustrating a state where the robot hand grips the pipette according to the first embodiment.

FIG. 8 illustrates a state where the pipette 31 is gripped by the robot hand 2. The pipette 31 has operation targets 311 and 312 and a display screen 314, and the operation target 312 has a concave shape. A second finger member 25 has a shape for fixing the pipette 31. When the display screen 314 is present on the grip target of the pipette 31, the display screen 314 is visible by providing the second finger member 25 with an opening 255 through which the display screen can be seen as illustrated in the drawing.

Figure 9:
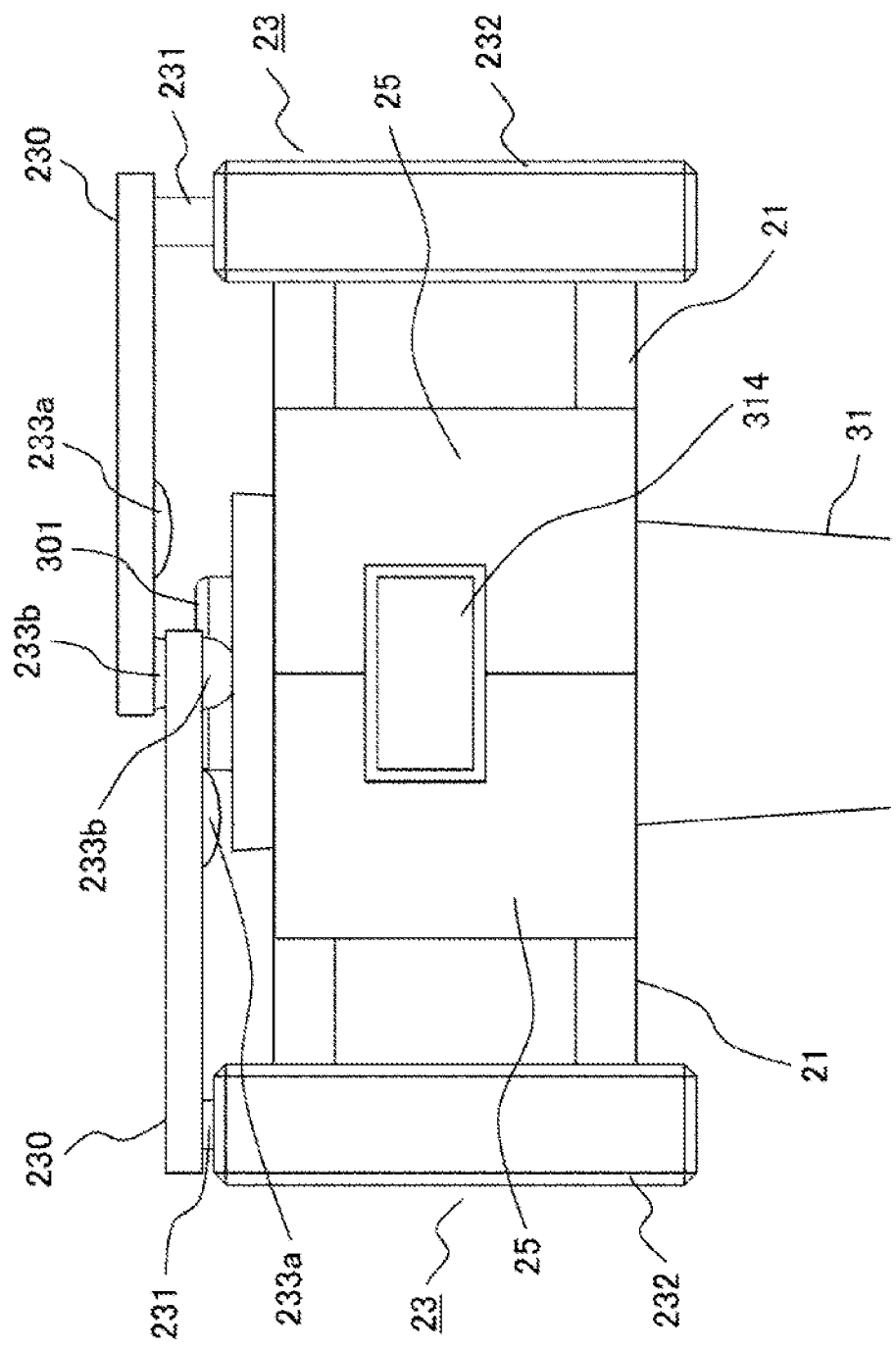
FIG. 9 is a view illustrating a positional relationship between an operating mechanism and a pipette grip target at the time of pipetting according to the first embodiment.

FIG. 9 is a front view illustrating a state where the robot hand 2 operates the pipette 31. Since the operation target 312 has a concave shape, the operation is performed by an operation protrusion 233b having a protrusion having a longer dimension in a stroke direction B and a higher dimension than the operation protrusion 233a. As described above, by operating the operation target by the protruding shape, it is also possible to cope with the concave shape operation target. In order to align the operation protrusion 233b with the position of the operation target 312, the second finger member 25 having a different thickness is used.

As in the above configuration, by providing a plurality of operation protrusions having different heights in the operation member 230, it is possible to cope with pipettes having operation targets having different shapes without replacing the operating mechanism 23.

Second Embodiment

Figure 10:
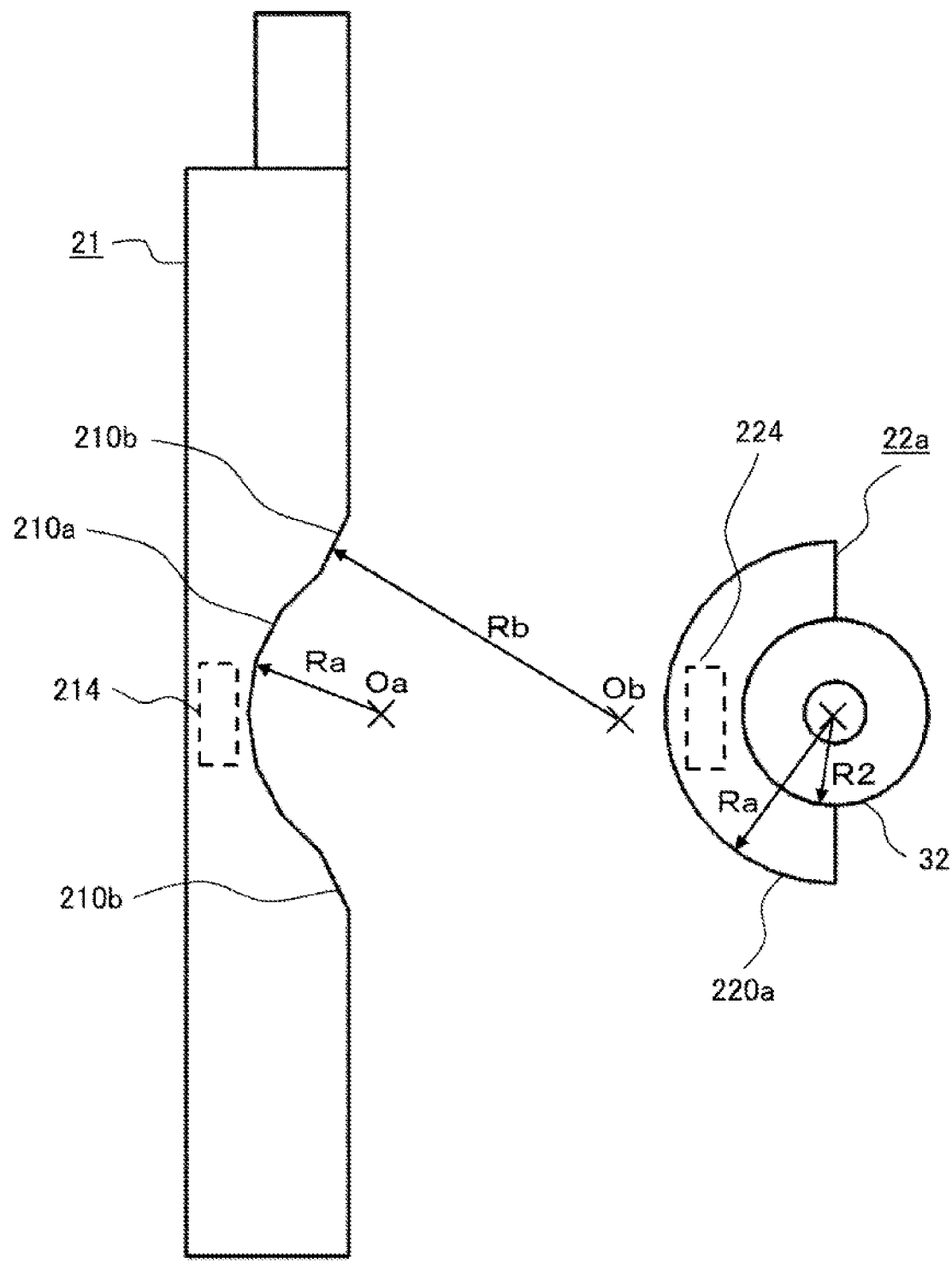
FIG. 10 is a view illustrating a configuration relationship between the first finger member and the second finger member in a second embodiment.
Figure 11:
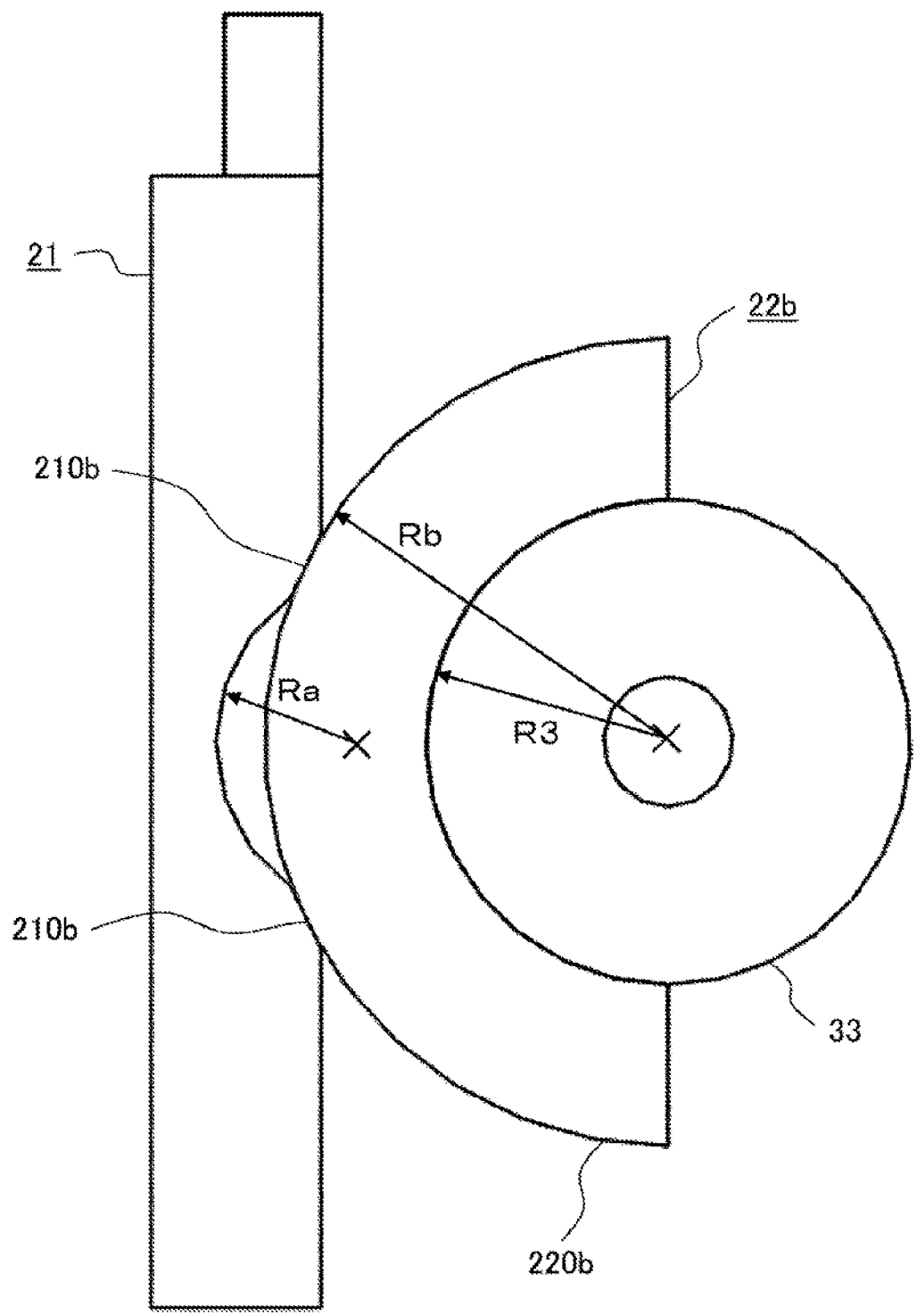
FIG. 11 is a view illustrating a state of fitting between a second cylindrical concave surface of the first finger member and the second finger member in a second embodiment.

FIGS. 10 and 11 illustrate a method of fixing the first finger member 21 and the second finger member 22 of the robot hand 2 according to a second embodiment of the present invention. However, the configuration not illustrated in FIGS. 10 and 11 is similar to that of the first embodiment.

In the second embodiment, the first finger member 21 and the second finger member 22 are fixed by a magnet 214 and a magnet 224 respectively incorporated therein. Here, the magnet may be a permanent magnet or an electromagnet. One of the magnet 214 and the magnet 224 may be a magnetic body.

According to the configuration of the present embodiment, since the fitting structure can be reduced, replacement of the second finger member 22 becomes easier.

The semi-cylindrical concave portion of the first finger member 21 in the present embodiment illustrated in FIG. 10 includes a first cylindrical concave surface 210a and a second cylindrical concave surface 210b for fitting with the plurality of second finger members. The two cylindrical concave surfaces 210a and 210b have different radii and circle centers. The cylindrical concave surface 210a has a radius Ra and a circle center Oa, and the cylindrical concave surface 210b has a radius Rb and a circle center Ob.

FIG. 10 illustrates a second finger member 22a for corresponding to a pipette 32 of the outer radius R2. The radius of the semi-cylindrical convex portion 220a of the outer shape of the second finger member 22a is Ra, and can be fitted to the first cylindrical concave surface 210a of the first finger member 21.

FIG. 11 illustrates the second finger member 22b for coping with a pipette 33 having an outer radius R3 larger than the radius Ra. The radius of the semi-cylindrical convex portion 220b of the outer shape of the second finger member 22b is Rb, and can be fitted to the second cylindrical concave surface 210b of the first finger member 21.

According to the configuration of the present embodiment, since the second finger member having different radii of the semi-cylindrical convex portion can be used, it is easier to cope with a plurality of pipettes having different outer diameters. Further, since the thickness of the second finger member can be adjusted to a value corresponding to the outer shape of the pipette, it is possible to prevent an increase in size of the second finger member.

Third Embodiment

Figure 12:
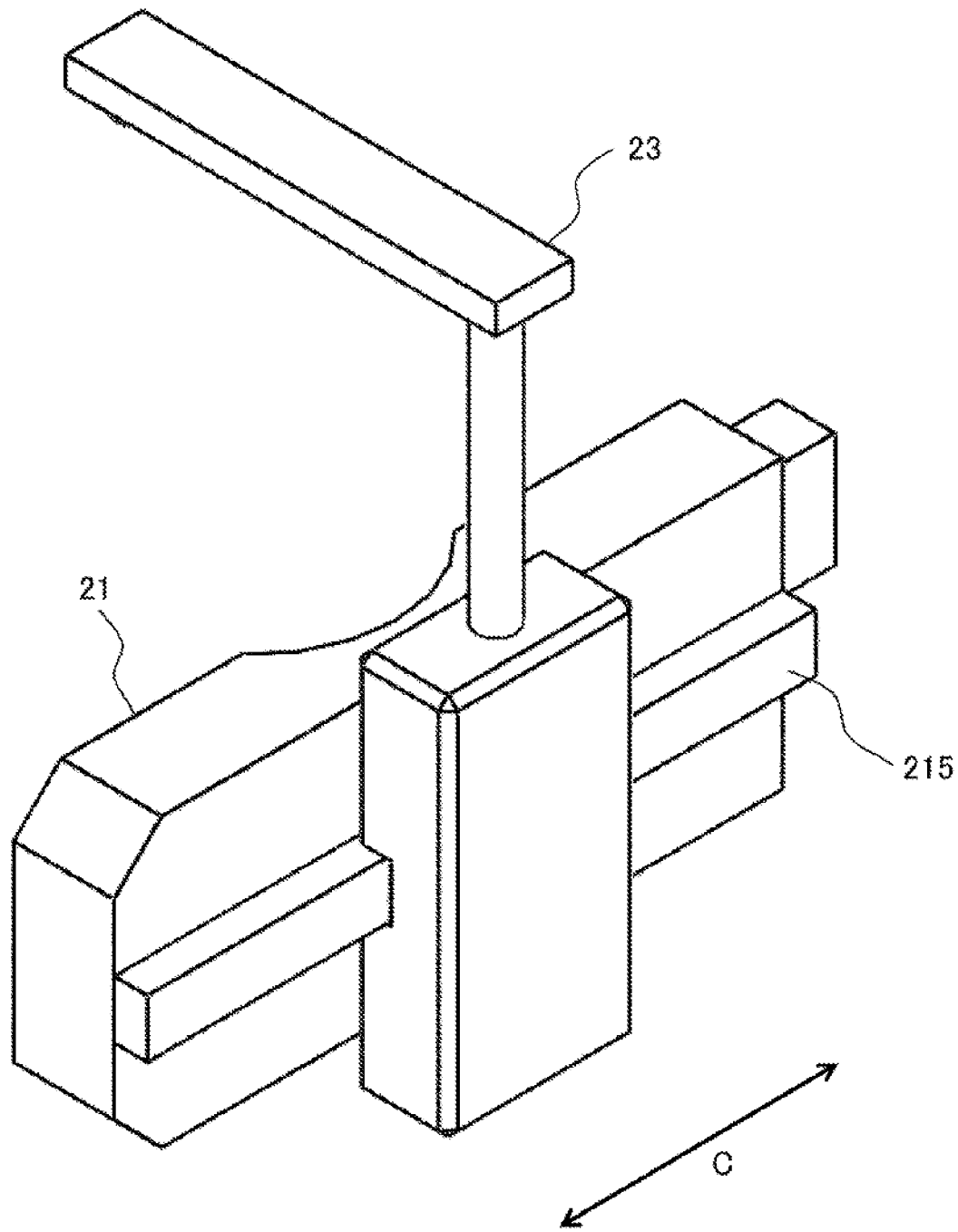
FIG. 12 is a view illustrating a configuration relationship between the first finger member and the operating mechanism in a third embodiment.

FIG. 12 illustrates a method for fixing the first finger member 21 and the operating mechanism 23 of the robot hand 2 according to a third embodiment of the present invention. However, the configuration not illustrated in FIG. 12 is similar to that of the first embodiment.

In the third embodiment, the fixing of the first finger member 21 and the operating mechanism 23 and the moving method of the operating mechanism 23 in the direction C are performed by an operating mechanism position adjusting slider 215. Further, in order to fix the positions of the first finger member 21 and the operating mechanism 23, magnets may be provided for each to fix the positions. In this case, a permanent magnet or an electromagnet may be used. Either one of them may be a magnetic body.

With the configuration of the present embodiment, the position of the operating mechanism 23 in the direction C can be adjusted steplessly, and there is no need to attach or detach the first finger member 21 to or from the hole. Therefore, replacement of the operating mechanism 23 and reduction of the position adjustment time can be expected.

What is claimed is:

1. A robot hand for gripping and operating a pipette, the robot hand comprising:
    an electric gripper including a motor that controls movement of the robot hand;
    a pair of first finger members opened and closed by the electric gripper;
    a pair of second finger members provided on the first finger member and having a pipette gripping surface; and
    an operating mechanism installed on the first finger member to operate an operation target of the pipette;
    the operating mechanism includes an actuator and an operation member driven by the actuator;
    the operation member protrudes from the first finger member to a side on which the pipette is gripped, and is movable in a longitudinal direction of the pipette by the actuator;
    the operation member has a first protrusion on a surface of the pipette facing the operation target; and
    the second finger member has such a thickness that, when the pipette is gripped, the operation target of the pipette is equal to a position of the first protrusion of the operation member.

2. The robot hand according to claim 1, wherein the first finger member is detachably mounted on the electric gripper.

3. The robot hand according to claim 1, wherein in the second finger member, the pipette gripping surface in contact with a grip target of the pipette is formed in a curved surface along the grip target of the pipette.

4. The robot hand according to claim 3, wherein the second finger member has a support surface on which a finger hook of the pipette is placed when the pipette is gripped, the support surface being capable of supporting the pipette in an operation direction of the operation target.

5. The robot hand according to claim 1, wherein the second finger member has a semi-cylindrical convex portion on a surface in contact with the first finger member, and the first finger member has a semi-cylindrical concave portion fitted to the semi-cylindrical convex portion of the second finger member.

6. The robot hand according to claim 5, wherein in the first finger member, two or more cylindrical concave surfaces having different radii and circle center positions are formed in the semi-cylindrical concave portion.

7. The robot hand according to claim 1, wherein a hole is formed in a surface of the first finger member on which the second finger member is installed, and the second finger member has a protrusion fitted into the hole of the first finger member on a surface facing the first finger member.

8. The robot hand according to claim 1, wherein the second finger member is attached to the first finger member by a magnetic force.

9. The robot hand according to claim 1, wherein the operation member includes a second protrusion having a different height on a surface of the pipette facing the operation target.

10. The robot hand according to claim 1, wherein the first finger member includes a unit capable of installing the operating mechanism at a plurality of positions.

11. The robot hand according to claim 1, wherein the operating mechanism includes a battery and a radio communication device, and is driven based on communication via the radio communication device.

12. The robot hand according to claim 1, wherein a plurality of the second finger members are prepared corresponding to a plurality of types of pipettes to be handled, and a second finger member corresponding to a pipette to be handled is installed on the first finger member, and a plurality of the operating mechanisms are prepared corresponding to the plurality of types of pipettes to be handled, and an operating mechanism corresponding to the pipette to be handled is installed on the first finger member.

* * * * *